United States Patent [19]

Perren

[11] 4,201,914

[45] May 6, 1980

[54] ELECTRICAL INSTRUMENT TO DETECT THE PRESENCE OF LIQUID AND METHOD OF OPERATING THE SAME

[76] Inventor: Benno Perren, Austrasse 33, 5430 Wettingen, Switzerland

[21] Appl. No.: 881,799

[22] Filed: Feb. 27, 1978

[30] Foreign Application Priority Data

Mar. 7, 1977 [CH] Switzerland .......................... 2788/77

[51] Int. Cl.² .......................... G01J 1/00; G01N 21/26
[52] U.S. Cl. ..................................... 250/341; 250/353; 250/577
[58] Field of Search ............... 250/338, 573, 564, 577, 250/341, 343, 353; 73/293; 340/619

[56] References Cited

U.S. PATENT DOCUMENTS

| | | | |
|---|---|---|---|
| 3,766,395 | 10/1973 | Keir ........................................ | 250/564 |
| 3,818,470 | 6/1974 | Hirsbrunner et al. ................. | 250/577 |
| 3,851,181 | 11/1974 | Heule ..................................... | 250/577 |
| 3,908,129 | 9/1975 | Akers ..................................... | 250/577 |
| 3,995,169 | 11/1976 | Oddon ................................... | 250/577 |

Primary Examiner—Alfred E. Smith
Assistant Examiner—Carolyn E. Fields
Attorney, Agent, or Firm—Werner W. Kleeman

[57] ABSTRACT

An electrooptical instrument for detecting the presence of liquid and a method of operating the same, comprising at least one monochromatic infrared source, a light conductor which totally reflects infrared radiation from at least one surface thereof, an infrared detector, and signal processing circuitry. According to the invention the infrared source has a maximum radiation strength of less than 200 mW/sterad, the main maximum in the angular distribution of the infrared radiation is at least approximately axially symmetric and oriented in the direction of the optical axis of the light conductor, and the angular distribution of the infrared radiation is such that the intensity falls off to half its maximum value less than 4° away from the symmetry axis. An electronic circuit causes the system to oscillate when no liquid is present. The instrument may be operated in a self-monitoring mode by monitoring the oscillations with two monostable multivibrators connected in parallel.

22 Claims, 13 Drawing Figures

ELECTRICAL INSTRUMENT TO DETECT THE PRESENCE OF LIQUID AND METHOD OF OPERATING THE SAME

BACKGROUND OF THE INVENTION

The present invention is concerned with a new and improved electrooptical instrument which can detect the presence of liquids, and also relates to a method of operating such electrooptical instrument.

Generally speaking, the electrooptical instrument of the present invention is of the type comprising at least one monochromatic infrared source, one light conductor which totally reflects infrared radiation at the surface of one end thereof, one infrared detector, and one electronic circuit for signal processing.

Instruments that perform this function are generally referred to as liquid sensing probes. A compact, practical unit is disclosed, for example, in Swiss Pat. No. 512,060 to which reference may be had and the disclosure of which is incorporated herein by reference, and which has a high sensitivity, is quite shock-proof, and requires no subsequent adjustments.

All of the liquid sensing probes known up to this time require relatively high-power light-emitting diodes in order to obtain a reproducible response. The use of instruments of this type is therefore forbidden in some countries for safety reasons, especially if they are employed in connection with highly explosive materials.

SUMMARY OF THE INVENTION

It is a primary object of the present invention to decrease the power necessary for the infrared source, and at the same time to improve the performance of the instrument so that any possible condensation of liquid droplets on the sensing probe does not give false readings.

Another object of the invention is to render it possible to employ this instrument with liquids, such as heavy oil, liquid tar and so forth, that otherwise could not be handled with conventional instruments where a sinking liquid level would build up a residue on the sensing probe.

Still a further object of the present invention relates to a new and improved method of operating such liquid sensing probe.

Now in order to implement these and still further objects of the invention which will become more readily apparent as the description proceeds, the electrooptical instrument of the present invention is manifested by the features that the infrared source has a maximum radiation strength $J_{max}$ of less than 200 mW/sterad, that the main maximum in the angular distribution characteristic of the radiation is at least approximately axially symmetric and directed along the optical axis of the light conductor, and that the angular distribution of the intensity is such that the intensity of the radiation falls off to half its maximum value less than 4° away from the symmetry axis.

Further, according to the invention, the electrooptical instrument is operated in such a way that an electronic circuit causes the system to oscillate when no liquid is present. The electrooptical instrument may be operated in a self-monitoring mode where with the help of monostable multivibrators monitoring cycles are formed which modulate the infrared source at a rate between 1 Hz and 200 kHz. These oscillations are interrupted by the presence of liquid at the end surface of the light conductor and/or a failure in the instrument caused by defective components or a fault in the transmission line, whereupon an appropriate signal is given to the monitoring unit for further processing.

With the teachings of the invention contained herein it is possible to construct fail-safe liquid sensors whose emission power lies far below the maximum value specified by even the strictest safety requirements.

Using a prototype of this invention, which had an emission power falling between 10 to 20 mW, it was possible to reproducibly detect liquid level changes of a few tenths of a millimeter.

The electrooptical instrument of the present invention can be beneficially employed for the monitoring of liquid levels where there is the danger of explosion, such as in oil, gasoline, benzene, and liquified gas storage tanks.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
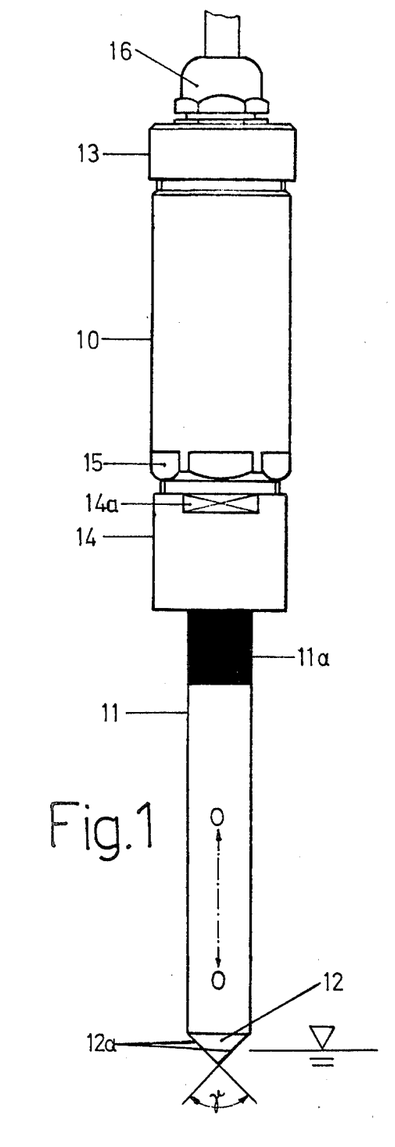
FIG. 1 schematically illustrates an embodiment of a liquid sensing probe constructed according to the invention that is safe to use where there is the danger of explosion.

Describing now the drawings, the exemplary embodiment of liquid sensing probe 1 shown in FIG. 1 has a housing 10 and a light conductor 11 with for instance a conical tip 12 having a surface area or boundary surfaces 12a. The housing 10 is here cylindrical in shape, by way of example, and is closed at its ends with a cap 13 and a centering bushing 14. A portion 14a of the centering bushing 14, which lies opposite one of the hexagonal sides 15 of the lower portion of the housing 10, is milled out or otherwise appropriately machined. A strainrelease nut 16 securely holds the not particularly referenced cable and is screwed to the cap 13.

The light conductor 11 advantageously consists of a bubble- and inclusion free quartz rod which is finished on one end with the conical tip 12 having a cone angle of 90°. The optical axis, which is identical with the symmetry axis of the quartz rod in this case, is designated by the line 0-0. The surface of a liquid, symbolically illustrated in FIG. 1, causes an interruption of a signal generated in the probe 1 and produces a means of indicating this state when it comes in contact with the conical tip of the probe.

Light conductors made from other materials such as acryl glass and ordinary glass have also proven to be suitable for use in the practice of this invention. The surface 12a of the light conductor 11 can form any angle between 30° and 120° with the optical axis 0-0. Furthermore, it is not even necessary to have a conical shape of the tip 12, as other shapes such as a simple oblique surface will also satisfy the requirements.

Figure 2:
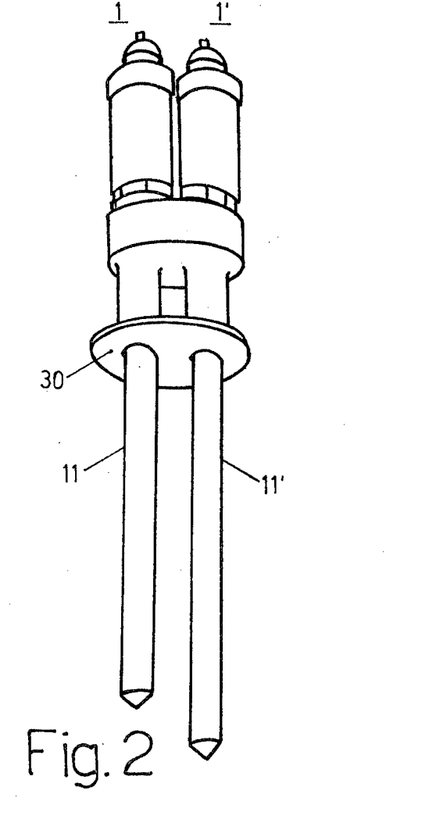
FIG. 2 illustrates two sensors connected to a common flange for maximum-minimum level control.

Two sensor probes 1 and 1' with their corresponding light conductors 11 and 11' are illustrated in FIG. 2. Both sensor probes are held to a common support flange 30 or other appropriate support means. Maximum-minimum level regulation is possible through the use of light conductors 11 and 11' having different lengths.

The probes 1 and 1' each employ infrared sources 17 which are capable of producing a maximum intensity of 32 mW/sterad at a wavelength of 940 nm. A light-emitting diode of the GaAs PN type (e.g. ASEA type 1A48 available from the well known Swedish firm ASEA Aktiebolag Vesteras, also known as "ASEA") has proven to be suitable for this application.

Figure 3:
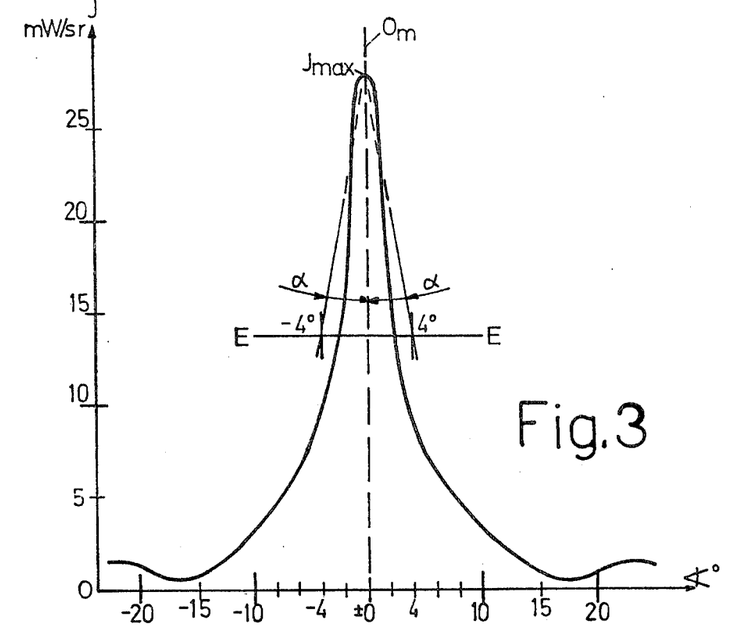
FIG. 3 shows the angular distribution of the radiation from an infrared source used in the practise of the invention.

In order to fulfill the requirements of the invention, the infrared source 17 must possess an intensity distribution that is essentially axially symmetric about the optical axis 0-0 of the light conductor. An example of this type of intensity distribution is depicted in FIG. 3. In order for the probe 1 to function properly it was determined that the half-width at half-height of the maximum in the intensity distribution, designated by the angle $\alpha$ measured along the plane E-E, must be less than 4°.

In the example shown in FIG. 3 the infrared source has a maximum intensity $J_{max}$ of 28 mW/sterad with the main maximum of the angular intensity distribution being nearly exactly aligned along the mechanical axis $O_m$. The half-angle $\alpha$ amount to about $\pm$ 3° in this case.

Figure 4:
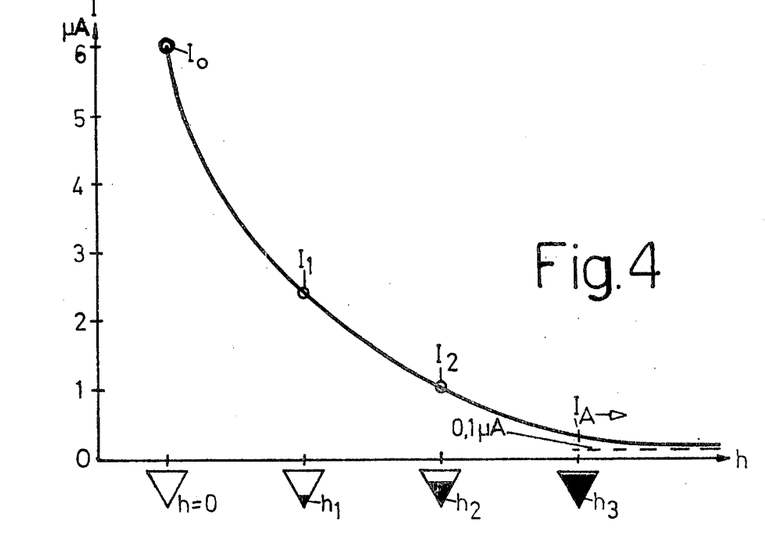
FIG. 4 is a plot of the current in the infrared detector as a function of the immersion depth of the conical tip of the probe.

The infrared detector 18 located in the probe 1 and, as the case may be, probe 1', produces a current that is roughly an exponential function of the distance h that the conical tip 12 is immersed in the liquid, symbolized in FIG. 4 by the size of the black triangles.

A silicon PIN-photodiode with a 9 mm² active collector area has proven to be a suitable infrared detector 18 for this invention. Such photodiodes are commercially available from the German firm Telefunken (type S 138P) or the Swedish firm ASEA (type 6B82).

Figure 5:
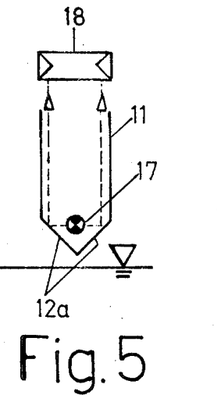
FIG. 5 schematically shows the optical path of the radiation of the light conductor when the conical tip is not immersed in the liquid.
Figure 6:
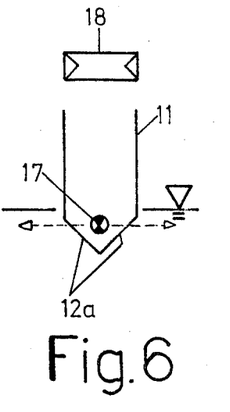
FIG. 6 schematically shows the optical path of the radiation in the light conductor when the conical tip is immersed in the liquid.

The operating principle of the probe of this invention can be explained by referring to FIGS. 5 and 6. In FIG. 5 an infrared source 17 radiates a narrow beam along the optic axis of the light conductor 11 which strikes the surfaces 12a. At these surfaces the rays, depicted here by the dashed lines, undergo total internal reflection and are received by the infrared detector 18 where they produce a resistance change, i.e. by continuous incidence of infrared energy the infrared detector 18 will have a constant resistance value. When the boundary surfaces 12a are immersed in a liquid as shown in FIG. 6, however, total internal reflection no longer occurs and no radiation can reach the infrared detector 18. The resistance of the infrared detector 18 is higher in this state than it is when the probe 1 is not immersed in the liquid.

Figure 7:
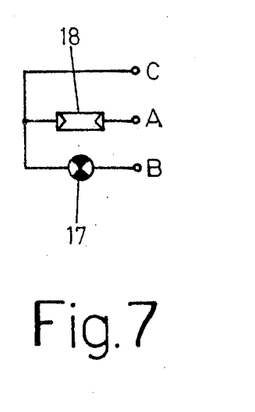
FIG. 7 shows the basic principle of the monitor circuit.

A circuit diagram of the basic elements in this arrangement is shown in FIG. 7. Reference characters A, B, and C designate the terminals for the signal output and for the power supply for the infrared source 17.

Figure 8:
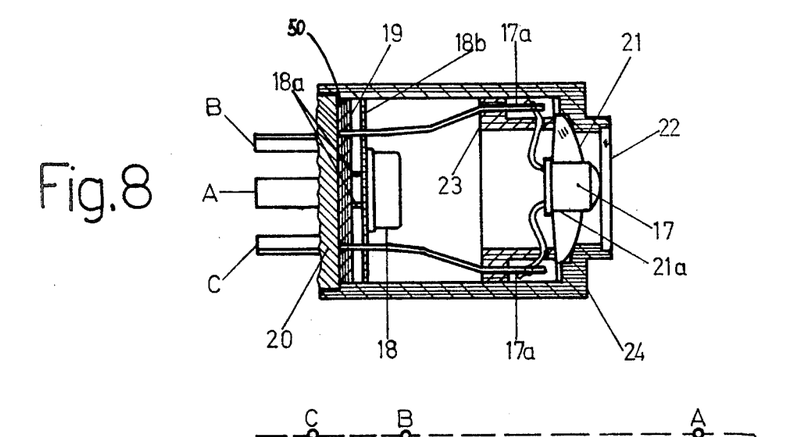
FIG. 8 shows a self-contained module based on the monitor circuit shown in FIG. 7.

FIG. 8 shows a self-contained module that operates according to the principles that were discussed previously. This module, designed to fit in the housing 10 of the probe 1, is shown here as an enlarged cross-sectional view. The shaded elements shown in FIG. 8 are made from any suitable insulating materials. The infrared source 17 is centered behind an infrared filter 22 by means of a lens 21—which may be a condenser or Fresnel lens—which has a hole 21a in the middle. The infrared filter 22 is mounted flush to the end of a hollow cylinder 24 by means of a not particularly reference countersunk hole. The infrared source 17 and the lens 21 are fastened inside the hollow cylinder 24 by means of a mounting ring 23. Behind this structure there is located in spaced relationship therefrom the infrared detector 18 which is mounted at a plate 18b. The connections 18a of the infrared detector 18 lead to an amplifier circuit 19 which is located on a circuit board 50. This circuit board 50 and its components are embedded in a suitable casting material 20 (e.g. "Scotch Cast" No. 8 from the 3M Co.). The terminals A, B, and C project from this casting material to form the pins of a connector.

The module shown in FIG. 8 is located inside the housing 10 of the probe 1 (FIG. 1) directly against the end face of the light conductor 11. The infrared source 17, powered through the connecting wires 17a, transmits rays through the infrared filter 22 in the direction of the optic or optical axis O-O. If the conical tip 12 is above the liquid level these axial rays undergo total internal reflection at the surfaces 12a and are reflected back to the infrared source 17. The condensor lens 21 focuses these rays in the direction of infrared detector 18 which converts the intensity of the radiation to an electrical signal.

Figure 9:
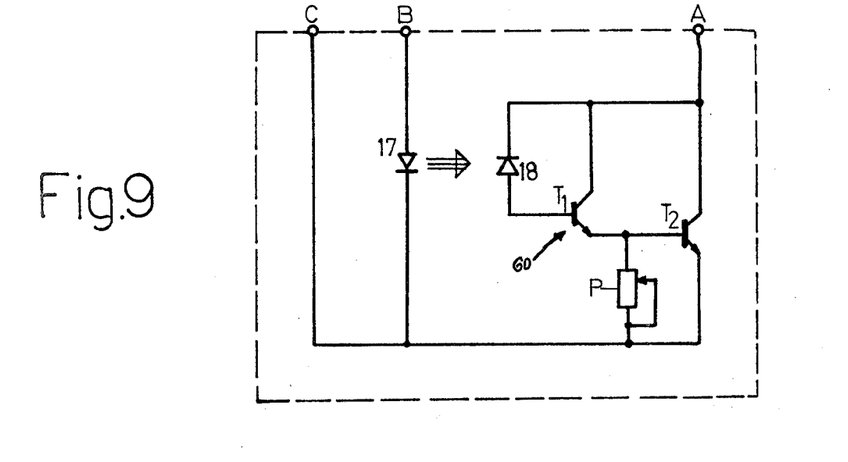
FIG. 9 shows a detailed electronic circuit of the module shown in FIG. 8.

FIG. 9 shows a detailed schematic diagram of the circuit referred to in FIG. 8. The infrared source 17, depicted as a diode in the diagram, radiates monochromatic infrared radiation, characterized by a wavelength of 940 nm with a spectral bandwidth $\Delta\lambda$ of 60 nm measured at the points of half power, onto the infrared detector 18. The 30 mW/sterad intensity of the light-emitting diode 17, measured with a disc-shaped photo-detector having a 1 cm² sensitive area located 32 mm away from the front glass lens of the light emitting diode, causes a change in the photo-current through the infrared photodetector diode 18. This photo-current is amplified by a factor of $10^4$ in a two-stage Darlington amplifier circuit, generally indicated by reference character 60. The operating point of the transistors $T_1$ and $T_2$, and hence the amplification factor, can be set with the trimmer potentiometer P.

Figure 10:
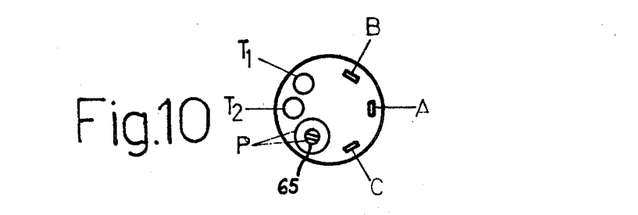
FIG. 10 is a view of the module from the end with the terminals.

FIG. 10 shows a view of the module (FIG. 8) as seen from the terminal end. Visible in this diagram are the terminals A, B, and C as well as the tops of the transistors $T_1$ and $T_2$ and the trimmer potentiometer P with its adjusting screw 65 which project somewhat out of the casting material.

Figure 11:
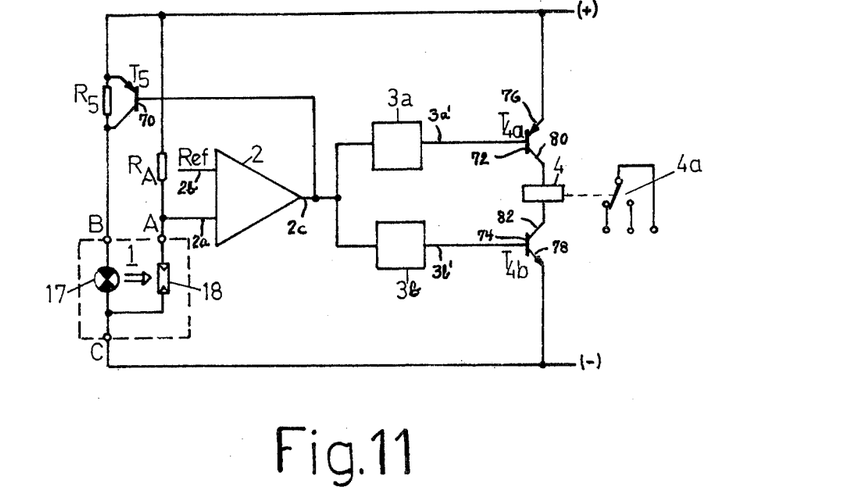
FIG. 11 shows a self-monitoring circuit for the probe shown in FIG. 1.
Figure 12A:
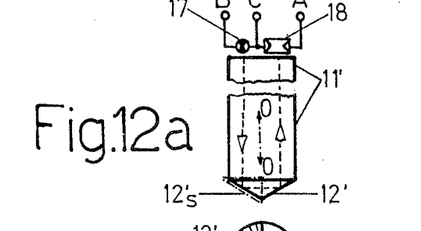
FIG. 12a is a schematic illustration of an embodiment of the probe shown in FIG. 1 that is designed especially for use in highly viscous liquids.
Figure 12B:
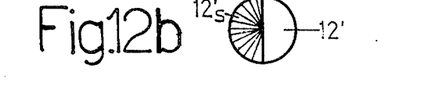
FIG. 12b is a view of the conical tip of the probe shown in FIG. 12a as seen from the liquid.

Electrical oscillations can be generated by employing additional circuitry external to the probe 1. Such a self-monitoring oscillator circuit is illustrated in FIG. 11. The probe 1 is schematically illustrated inside the block bounded by the dashed lines. A negative potential is applied to terminal C of the probe 1. Terminal B leads to an emitter-collector resistor $R_5$ of transistor $T_5$. Terminal A of the probe 1 leads to a resistor $R_A$, one end of which is connected to a positive potential and the other end of which is connected to one input $2a$ of a comparator 2. The output $2c$ of the comparator 2 is led directly to the base 70 of the transistor $T_5$ as well as to the multivibrators $3a$ and $3b$ whose outputs $3a'$ and $3b'$ feed the bases 72 and 74 of the transistors $T_{4a}$ and $T_{4b}$, respectively. A reference potential Ref. is fed to the other input $2b$ of the comparator 2. The emitters 76 and 78 of the transistors $T_{4a}$ and $T_{4b}$ lie at positive and negative potentials, respectively. The collectors 80 and 82 of the transistors $T_{4a}$ and $T_{4b}$ are connected to a coil of an output relay 4. The relay contacts are designated by reference character $4a$.

A monitoring cycle of this system operates as follows: when the system is first turned on the infrared source 17 is still turned off and the photo-resistance of the infrared detector 18 is very high. Then the voltage level at the input to the comparator (terminal A) begins to increase and eventually exceeds the reference potential, whereupon the output signal of the comparator 2 is changed in such a way as to turn on the infrared source 17. As soon as this infrared radiation reaches the infrared detector 18 its photo-resistance decreases and the voltage level at the comparator 2 starts to fall. When this potential falls below the value of the reference potential, the comparator 2 changes its output state to interrupt the current to the infrared source 17, and the photo-resistance of the infrared detector 18 returns to its initial high value. Now the voltage level at the input $2a$ to the comparator 2 again begins to rise and, as soon as the reference potential is exceeded, the output of the comparator turns the infrared source back on, and so forth. The oscillations occurring at the output $2c$ of the comparator 2 are monitored by two monostable multivibrators, $3a$ and $3b$, which are connected in parallel. Each of the multivibrators, $3a$ and $3b$, independently controls the output circuit which includes the relay 4 with its isolated relay contacts $4a$.

The system described above gives an indication when the operating state is changed either through a change in the liquid level or through a disturbance caused by a faulty componet or a failure in the signal transmission line.

The details mentioned in this embodiment of the invention can be varied in a number of ways. As already mentioned, the collector lens 21 could, for example, be replaced by a Fresnel lens. This would have the advantage of making it easier to drill the hole $21a$ through the center of the lens.

In order to prevent the system from responding to stray reflections from the outer surface of the light conductor 11, it is advisable to coat at least part of the outside of the light conductor with an infrared absorber $11a$. This coating could be in the form of a bituminous mastic as is shown in FIG. 1. The coating $11a$ also may constitute a semitransparent reflector.

This precaution is particularly recommended when monitoring emulsified liquids that are strongly light scattering. Because of the low optical density of these liquids, there is only about a 20% decrease in the energy received by the detector, as compared to the non-immersed state, when the conical tip 12 of the probe is immersed in the liquid. Under these circumstances the stray light reflected at the surface of the light conductor 11 could cause a false response or indication.

The operation of this electrooptical instrument is distinguished by the fact that the infrared receiver 18 only responds to the axial rays that are reflected at most two times from the boundary surface or surfaces $12a$. The narrow beam, the infrared absorbing layer, the infrared filter, and the geometrical configuration of the infrared source and detector are designed with this goal in mind and enable a reproducible switching threshold at the lowest possible energies.

Such an optimized probe is represented in FIG. 4 by the characteristic current curve of its infrared detector 18. The switching point for this case occurs when the liquid level reaches 95-99% of the height of the conical tip 12 of the probe. For this example an infrared detector current of 0.1 $\mu$A was measured when the conical tip 12 was fully immersed, and the switching threshold could be set at 0.15 $\mu$A without difficulty.

In the curve of FIG. 4 the detector current in the non-immersed, $\frac{1}{3}$ immersed, and $\frac{2}{3}$ immersed states of the conical tip 12 is designated by $I_0$, $I_1$, and $I_2$, respectively. The operating region of this curve is designated by $I_A$. This operating region is fixed by the value of the series resistance connected to the infrared detector 18, e.g. by the resistor $R_A$ in FIG. 11. An electronic circuit causes the system to oscillate when no liquid is present. The instrument may be operated in a self-monitoring mode by monitoring the oscillations with two monostable multivibrators connected in parallel.

An advantageous modification of the probe of FIG. 1 is illustrated in FIGS. $12a$ and $12b$. This type of probe has proven to be especially useful when it is necessary to detect the presence of highly viscous media such as heavy oil, resin, etc., In this modification the light conductor $11'$ has a conical tip $12'$ with a cone angle of 90°, part of whose surface $12's$ is silvered as is shown in FIG. $12b$. The infrared source 17 and the infrared detector 18 are located next to each other at the other end of the light conductor. The radiation pattern of the infrared source is directed along the optical axis O-O of the light conductor 11. The infrared rays, corresponding to the dashed lines running parallel to the optic or optical axis O-O, are reflected at the silvered surface $12's$ and, if no liquid is present, are again reflected at the adjacent face to be received by the infrared detector 18. The circuit diagram for the infrared source 17 and the infrared detector 18 is given in FIG. 7. The silvered surface increases the intensity of the reflected radiation and this improves the response of the infrared detector 18 to liquid level changes. The same effect could also be achieved by silvering the side or surface of the conical tip $12's$ that lies opposite the infrared detector 18.

The new and improved instrument or liquid sensing probe described herein is particularly suited for monitoring the level of liquids where there is the danger of explosion, such as in oil, gasoline, benzene, and liquified gas storage tanks. It can perform the tasks that were not possible to carry out with conventional instruments. The main advantages of the probe 1 can be summarized as follows:

(a) no moving parts;
(b) also functions in liquid-like materials;
(c) with the use of appropriate electronics is completely self-monitoring;
(d) intrinsically safe circuits;
(e) insensitive to;
 (i) vapor clouds
 (ii) residual liquids
 (iii) foam
 (iv) fouling
 (v) splashing
(f) not influenced by:
 (i) viscosity of the liquid
 (ii) temperature (probe tip can withstand temperatures between $-190°$ C. to $350°$ C.)
 (iii) dielectric constant
 (iv) refractive index
 (v) color
 (vi) surrounding illumination (daylight)
(g) applicable to:
 (i) all solvents
 (ii) acids
 (iii) bases
 (iv) mineral oil products such as fuel, oil, gasoline, kerosene, fuel oil compounds and heavy fuel oils ($T \geq 30°$ C.).
 (v) emulsions like milk, cream, paint, etc.
 (vi) beer (to detect level of liquid-foam interface).

While there are shown and described present preferred embodiments of the invention, it is to be distinctly understood that the invention is not limited thereto, but may be otherwise variously embodied and practiced within the scope of the following claims. ACCORDINGLY,

What I claim is:

1. In an electrooptical instrument to detect the presence of liquid, containing at least a monochromatic infrared source, a light conductor having an optical axis and which totally reflects infrared radiation from at least one surface thereof, an infrared detector, and signal processing circuitry, the improvement which comprises:
 the infrared source has a maximum radiation strength of less than 200 mW/sterad;
 the main maximum in the angular distribution of the infrared radiation is at least approximately axiallysymmetric and oriented in the direction of the optical axis of the light conductor;
 the angular distribution of the infrared radiation is such that the intensity falls off to half its maximum value less than 4° away from the symmetry axis; and
 a resistor is connected in series with said infrared detector.

2. The electrooptical instrument as defined in claim 1, further including:
 at least one lens placed to focus reflected infrared light toward said infrared detector.

3. The electrooptical instrument as defined in claim 1, further including:
 at least one infrared filter placed in front of said infrared detector.

4. The electrooptical instrument as defined in claim 1, wherein:
 said light conductor has a surface that forms an angle of 30°-120° with the optical axis.

5. The electrooptical instrument as defined in claim 4, wherein:
 said light conductor is a quartz rod with a conical tip provided with said one surface and having a cone apex angle of at least approximately 90°.

6. The electrooptical instrument as defined in claim 1, wherein:
 said light conductor is substantially cylindrical in shape and at least partially coated on the outside with an infrared absorber.

7. The electrooptical instrument as defined in claim 1, wherein said light conductor is substantially cylindrical in shape and at least partially coated on the outside with a semitransparent reflector.

8. The electrooptical instrument as defined in claim 1, wherein:
 said infrared detector is structured such that it only responds to rays that have been reflected no more than two times from the surface of the light conductor.

9. The electrooptical instrument as defined in claim 1, wherein:
 said infrared source, said light conductor and said infrared detector define a probe; and
 two of said probes having different length light conductors are fastened together at a common support means in order to enable maximum-minimum liquid level regulation.

10. In an electrooptical instrument to detect the presence of liquid, containing at least a monochromatic infrared source, a light conductor having an optical axis and which totally reflects infrared radiation from at least one surface thereof, an infrared detector, and signal processing circuitry, the improvement which comprises:
 the infrared source has a maximum radiation strength of less than 200 mW/sterad;
 the main maximum in the angular distribution of the infrared radiation is at least approximately axially symmetric and oriented in the direction of the optical axis of the light conductor;
 the angular distribution of the infrared radiation is such that the intensity falls off to half its maximum value less than 4° away from the symmetry axis;
 at least one member is placed in front of said infrared detector;
 said at least one member is a lens; and
 the lens is a condensor lens having a central hole.

11. In an electrooptical instrument to detect the presence of liquid, containing at least a monochromatic infrared source, a light conductor having an optical axis and which totally reflects infrared radiation from at least one surface thereof, an infrared detector, and signal processing circuitry, the improvement which comprises:
 the infrared source has a maximum radiation strength of less than 200 mW/sterad;
 the main maximum in the angular distribution of the infrared radiation is at least approximately axially symmetric and oriented in the direction of the optical axis of the light conductor;
 the angular distribution of the infrared radiation is such that the intensity falls off to half its maximum value less than 4° away from the symmetry axis;
 at least one member is placed in front of said infrared detector;
 said at least one member is a lens; and
 said lens is a Fresnel lens.

12. In an electrooptical instrument to detect the presence of liquid, containing at least a monochromatic infrared source, a light conductor having an optical axis and which totally reflects infrared radiation from at least one surface thereof, an infrared detector, and signal processing circuitry, the improvement which comprises:
- the infrared source has a maximum radiation strength of less than 200 mW/sterad;
- the main maximum in the angular distribution of the infrared radiation is at least approximately axially symmetric and oriented in the direction of the optical axis of the light conductor;
- the angular distribution of the infrared radiation is such that the intensity falls off to half its maximum value less than 4° away from the symmetry axis; and
- said infrared source is a light-emitting diode with a radiation strength of at most 30 mW/sterad, measured with a disc-shaped photodetector with a 1 cm² sensitive area placed 32 mm away from a glass lens built into the front of the light-emitting diode.

13. The electrooptical instrument as defined in claim 12, wherein:
- said signal processing circuitry includes an electronic signal amplifier circuit provided for said infrared detector; and
- the infrared source, the lens, the infrared detector and its electronic signal amplifier circuit are mounted together in a self-contained module.

14. In an electrooptical instrument to detect the presence of liquid, containing at least a monochromatic infrared source, a light conductor having an optical axis and which totally reflects infrared radiation from at least one surface thereof, an infrared detector, and signal processing circuitry, the improvement which comprises:
- the infrared source has a maximum radiation strength of less than 200 mW/sterad;
- the main maximum in the angular distribution of the infrared radiation is at least approximately axially symmetric and oriented in the direction of the optical axis of the light conductor;
- the angular distribution of the infrared radiation is such that the intensity falls off to half its maximum value less than 4° away from the symmetry axis;
- said infrared detector is structured such that it only responds to rays that have been reflected no more than two times from the surface of the light conductor; and
- an electronic circuit for causing the system of the electrooptical instrument to oscillate when no liquid is present.

15. The electrooptical instrument as defined in claim 14, wherein:
- said electronic circuit provides a self-monitoring means for the electrooptical instrument and includes monostable multivibrators for forming monitoring cycles which modulate the infrared source at a rate between 1 Hz and 200 kHz;
- said oscillations being interrupted by the presence of any one of liquid at said surface of the light conductor, failure in the instrument caused by defective components or a fault in the transmission line, whereupon an appropriate signal is given to a monitoring unit for further processing.

16. The electrooptical instrument as defined in claim 14, further including:
- a substantially conical tip incorporating said at least one surface provided for said light conductor;
- a resistor connected in series with the infrared detector and having a resistance value of a magnitude such as to determine the operating point of the infrared detector such that the instrument delivers a signal for further processing when said conical tip is immersed by more than 30% in the liquid that is to be detected.

17. In an electrooptical instrument for detecting the presence of liquid, such as for monitoring liquid levels where there is a danger of explosion, such as in oil, gasoline and benzene and liquified gas storage tanks, containing at least a monochromatic infrared source, a light conductor having an optical axis and which totally reflects infrared radiation from at least one surface thereof, an infrared detector, and signal processing circuitry, the improvement which comprises:
- the infrared source has a maximum radiation strength of less than 200 mW/sterad;
- the main maximum in the angular distribution of the infrared radiation is at least approximately axially symmetric and oriented in the direction of the optical axis of the light conductor;
- the angular distribution of the infrared radiation is such that the intensity falls off to half its maximum value less than 4° away from the symmetry axis; and
- a resistor is connected in series with said infrared detector.

18. A method of operating an electrooptical instrument for detecting the presence of liquid, which instrument contains at least a monochromatic infrared source, a light conductor having an optical axis and which totally reflects infrared radiation from at least one surface thereof, an infrared detector, and signal processing circuitry, the infrared source having a maximum radiation strength of less than 200 mW/sterad, the main maximum in the angular distribution of the infrared radiation is at least aproximately axially symmetric and oriented in the direction of the optical axis of the light conductor, and the angular distribution of the infrared radiation is such that the intensity falls off to half its maximum value less than 4° away from the symmetry axis, which method includes the steps of:
- structuring the infrared detector so as to respond only to rays which have been reflected no more than two times from the surface of the light conductor; and
- employing an electronic circuit to oscillate the electrooptical instrument when no liquid is present.

19. The method as defined in claim 18, further including the steps of:
- foming monitoring cycles for modulating the infrared source at a rate between 1 Hz and 200 kHz; and
- interrupting these oscillations by the presence of any one of liquid at a free end surface of the light conductor, failure in the electrooptical instrument caused by defect of components or a fault in the transmission line; and
- upon such occurrence delivering a signal to a monitoring unit for further processing.

20. The method as defined in claim 19, further including the steps of:
- utilizing monostable multivibrators for forming said monitoring cycles.

21. The method as defined in claim 18, including the steps of:
- determining the operating point of the infrared detector by the resistance value of a resistor connected in series with the infrared detector such that a signal is delivered for further processing when a free end of the light conductor is immersed by more than 30% in the liquid which is to be detected.

22. The method as defined in claim 18, further including the steps of using:
two probes having different length light conductors for enabling maximum-minimum liquid level regulation.

* * * * *